US009256788B2

(12) United States Patent
Ramachandran et al.

(10) Patent No.: US 9,256,788 B2
(45) Date of Patent: Feb. 9, 2016

(54) METHOD FOR INITIALIZING AND SOLVING THE LOCAL GEOMETRY OR SURFACE NORMALS OF SURFELS USING IMAGES IN A PARALLELIZABLE ARCHITECTURE

(71) Applicant: QUALCOMM Incorporated, San Diego, CA (US)

(72) Inventors: Mahesh Ramachandran, San Diego, CA (US); Daniel Wagner, Vienna (AT); Murali Ramaswamy Chari, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 296 days.

(21) Appl. No.: 13/789,577

(22) Filed: Mar. 7, 2013

(65) Prior Publication Data

US 2014/0126768 A1    May 8, 2014

Related U.S. Application Data

(60) Provisional application No. 61/722,089, filed on Nov. 2, 2012.

(51) Int. Cl.
| | |
|---|---|
| *G06K 9/00* | (2006.01) |
| *G06K 9/36* | (2006.01) |
| *G06K 9/64* | (2006.01) |
| *G06K 9/32* | (2006.01) |
| *G06T 15/00* | (2011.01) |

(Continued)

(52) U.S. Cl.
CPC ........ *G06K 9/00711* (2013.01); *G06K 9/00201* (2013.01); *G06K 9/00214* (2013.01); *G06T 7/204* (2013.01); *G06T 17/20* (2013.01); *G06T 2207/10016* (2013.01)

(58) Field of Classification Search
None
See application file for complete search history.

(56) References Cited

U.S. PATENT DOCUMENTS

| 8,270,767 B2* | 9/2012 | Park | G08B 13/19641 345/420 |
|---|---|---|---|
| 2005/0174346 A1* | 8/2005 | Park | G06T 15/04 345/422 |

(Continued)

FOREIGN PATENT DOCUMENTS

EP    2249311 A1    11/2010

OTHER PUBLICATIONS

International Search Report and Written Opinion—PCT/US2013/065249—ISA/EPO—Jan. 16, 2014.

(Continued)

*Primary Examiner* — Matthew Bella
*Assistant Examiner* — Jose M Torres
(74) *Attorney, Agent, or Firm* — Kilpatrick Townsend & Stockton LLP (57) ABSTRACT

A system and method is described herein for solving for surface normals of objects in the scene observed in a video stream. The system and method may include sampling the video stream to generate a set of keyframes; generating hypothesis surface normals for a set of mappoints in each of the keyframes; warping patches of corresponding mappoints in a first keyframe to the viewpoint of a second keyframe with a warping matrix computed from each of the hypothesis surface normals; scoring warping errors between each hypothesis surface normal in the two keyframes; and discarding hypothesis surface normals with high warping errors between the first and second keyframes.

40 Claims, 7 Drawing Sheets

(51) Int. Cl.
*G06T 17/20* (2006.01)
*G06T 7/20* (2006.01)

(56) References Cited

U.S. PATENT DOCUMENTS

2006/0013450 A1* 1/2006 Shan .................. G06K 9/00201
382/123
2007/0031062 A1* 2/2007 Pal et al. ....................... 382/284
2007/0122001 A1* 5/2007 Wang et al. ................... 382/103
2007/0263000 A1* 11/2007 Krupnik et al. ............... 345/473
2014/0111511 A1* 4/2014 Raif .............................. 345/420

OTHER PUBLICATIONS

Molton Nicholas, et al., "Locally Planar Patch Features for Real-Time Structure from Motion", Procedings of the British Machine Vision Conference 2004, Jan. 1, 2004, 10 Pages, XP055093078.

* cited by examiner

METHOD FOR INITIALIZING AND SOLVING THE LOCAL GEOMETRY OR SURFACE NORMALS OF SURFELS USING IMAGES IN A PARALLELIZABLE ARCHITECTURE

RELATED MATTERS

This application claims the benefit of the earlier filing date of provisional application No. 61/722,089, filed Nov. 2, 2012.

FIELD

The subject matter disclosed herein relates generally to systems, methods and apparatus used in applications, such as computer vision and augmented reality (AR) applications, for mapping and tracking techniques. Specifically, a system and process for computing surfaces normals by comparing hypothesis normals in sets of keyframes in a parallelizable architecture.

BACKGROUND

Relevant Background

Applications such as gaming, computer vision and augmented reality systems rely on accurate and efficient detection and tracking of objects. Tracking a camera in an unknown environment, or tracking an unknown object moving in front of a camera involves first building an appearance and structure representation of the environment or object. Subsequently the tracking may proceed by matching image features from an incoming image with stored appearance representations of feature patches, which may be stored as keyframes.

In order to match features from a past keyframe (a first frame) onto a current frame (a second frame), the local appearance or pixel intensities surrounding the feature point location in the past keyframe (the first frame) are compared, for the extent of similarity, with the local appearance or pixel intensities in a candidate region in the current frame (the second frame) where the feature is expected to be located. One commonly used method to quantify or measure the extent of similarity is through use of a Normalized Cross Correlation (NCC) score between a window of pixels in the past keyframe and a window of pixels in the current keyframe. At the correct location of the feature in both frames/images, the NCC score between the window of pixels from the two frames/images is high, indicating a good similarity. However when the camera pose of the two images are quite different and there is a change in the appearance of the feature in the two images, the feature windows cannot be directly compared, and the NCC score is low. In this situation, the image area surrounding the feature location in the first frame has to be warped to the viewpoint of the image area of the second frame to look similar to the appearance of the feature as seen in the second frame from the second viewpoint. The local geometry of the environment or the local surface normal is important for this matching to warp appearances from one view to another, for wide baseline matching from two different viewpoints. The geometry of the scene is commonly approximated as small planar patches centered at the 3D feature point locations, and with an arbitrary plane normal vector in 3D. With this representation of the local geometry, the normal vector of the planar patch centered at each 3D feature point location is needed in order to warp the appearance of the window around a feature location in an image from one viewpoint to another. In addition, for augmentations to interact with the environment in a dynamic way, estimates of the surface normals or patch normals are needed. For example, a bouncing ball augmentation can be made realistic if the normals of the surfaces from which it is made to bounce off are known; and in the application of augmented reality, these are the surface normals of patches centered at the 3D feature points. Traditionally, these normals are estimated using an iterative gradient descent algorithm that minimizes the sum squared difference between the warped patches. For example, Nicholas Molton, Andrew Davison, and Ian Reid describe such an estimation in their paper entitled "Locally Planar Patch Features for Real-Time Structure from Motion", which was presented at the 2004 British Machine Vision Conference. This approach is an inherently iterative algorithm, which is difficult to parallelize. In addition, this process requires a relatively accurate initial solution to converge to the global optimum. This requires the computation of gradients, which need higher precision for representation. Due to computational limits, most traditional solutions are also not invariant to lighting changes.

SUMMARY

An embodiment of the invention is directed to performing camera and object tracking by solving the local geometry or surface normals of objects in a captured video stream. In one embodiment, hypothesis normals for 3D feature points in a scene visible in the video stream are generated. The hypothesis normals represent approximations of surface normals relative to an object seen by a moving camera. As the video stream pans from a first keyframe to a different view of the object represented in a second keyframe, the correct surface normal among all the normals hypothesized for a particular 3D feature point is the one that has the following property: when the correct normal is used for warping a window/patch of pixels centered around the image feature location in the first keyframe into the camera view of the second keyframe, the warped window of pixels from the first frame has a high correlation with the corresponding window of pixels in the second keyframe. An incorrectly hypothesized normal that is used for warping the pixels from the first keyframe to the second keyframe will result in a low correlation score between the warped window of pixels in the first frame and the window of pixels in the second keyframe. In one embodiment, a window/patch of pixels may be a square or rectangular grid or patch of pixels (e.g., an 8×8 or 10×12 grid of pixels) centered at a predetermined location. In one embodiment, if there are more than two keyframes, the correct normal may result in a high correlation score after this warping procedure, between any two keyframes. Following the computation/estimation of accurate surface normals, corresponding objects or points between keyframes in the video stream may be precisely matched and tracked.

In one embodiment, hypothesis normals for sets of keyframes are analyzed in a parallelizable architecture to determine their accuracy, where the set of normals are evaluated in parallel for determination of a high correlation score, after warping, between pairs of keyframes. Hypothesizing possible surface normals and determining their accuracy using multiple pairs of keyframes provides a solution that is robust to image noise, compared to an alternative that employs gradient descent or similar iterative approaches. Additionally, being able to implement the computations in a parallel way results in a faster solution in comparison to an iterative or similar approach.

Another embodiment is directed to a method for solving for surface normals of objects in a video stream, comprising: sampling the video stream to generate a set of keyframes;

selecting corresponding image points in the set of keyframes; generating 3D feature points in a scene imaged by the set of keyframes using the corresponding image points in two or more keyframes; generating hypothesis surface normals for the 3D feature points; warping image pixel patches corresponding to 3D feature points in a first keyframe to the viewpoint of a second keyframe with a warping matrix computed from each of the hypothesis surface normals; scoring warping errors resulting from each hypothesis surface normal between the first and second keyframes; and discarding hypothesis surface normals that produce high warping errors between the first and second keyframes.

Another embodiment is directed to a non-transient machine-readable medium comprising instructions, which, when executed by a machine, cause the machine to perform operations for solving for surface normals of objects in a video stream, the instructions comprising: sample the video stream to generate a set of keyframes; select corresponding image points in the set of keyframes; generate 3D feature points in the scene imaged by the set of keyframes using the corresponding image points in two or more keyframes; generate hypothesis surface normals for the set of 3D feature points; warp image pixel patches corresponding to 3D feature points in a first keyframe to the viewpoint of a second keyframe with a warping matrix computed from each of the hypothesis surface normals; score warping errors resulting from each hypothesis surface normal between the first and second keyframes; and discard hypothesis surface normals that produce high warping errors between the first and second keyframes.

Another embodiment is directed to a computing device for solving for surface normals of objects in a video stream, comprising: a sampling means for sampling the video stream to generate a set of keyframes; a hypothesis means for selecting corresponding image points in the set of keyframes, generating 3D feature points in a scene imaged by the set of keyframes using the corresponding image points in two or more keyframes, and generating hypothesis surface normals for the 3D feature points; a warping means for warping pixel image patches corresponding to 3D feature points in a first keyframe to the viewpoint of a second keyframe with a warping matrix computed from each of the hypothesis surface normals; a scoring means for scoring warping errors resulting from each hypothesis surface normal between the first and second keyframes; and an elimination means for discarding hypothesis surface normals that produce high warping errors between the first and second keyframes.

Another embodiment is directed to a computing device with a processor for solving for surface normals of objects in a video stream, comprising: a camera for capturing the video stream; a surface normal solver, comprising: a sampling unit for sampling the video stream to generate a set of keyframes; a hypothesis unit for selecting corresponding image points in the set of keyframes, generating 3D feature points in a scene imaged by the set of keyframes using the corresponding image points in two or more keyframes, and generating hypothesis surface normals for the 3D feature points; a warping unit for warping image pixel patches corresponding to 3D feature points in a first keyframe to the viewpoint of a second keyframe with a warping matrix computed from each of the hypothesis surface normals; a scoring unit for scoring warping errors resulting from each hypothesis surface normal between the first and second keyframes; and an elimination unit for discarding hypothesis surface normals that produce high warping errors between the first and second keyframes.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

Figure 1:
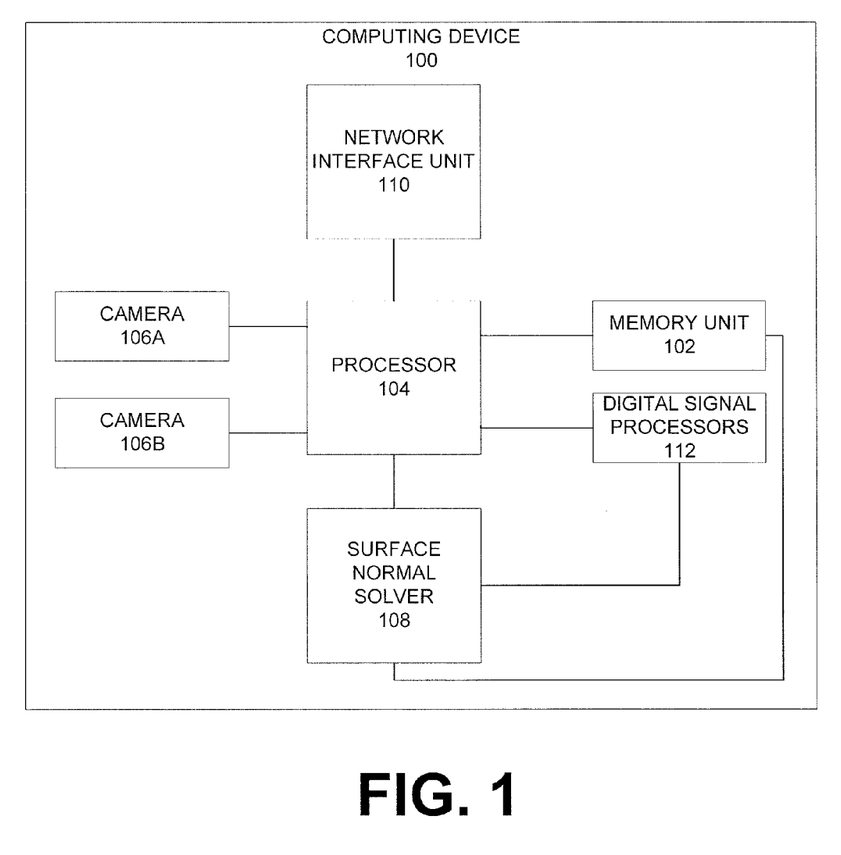
FIG. 1 shows a component diagram for a computing device that may track a camera in an unknown environment and/or may track an unknown object moving in front of the camera using estimated surface normals.

FIG. 1 shows a component diagram for a computing device 100 that may track a camera in an unknown environment and/or may track an unknown object moving in front of the camera using estimated surface normals. The computing device 100 may be a desktop computer, a laptop computer, a mobile phone, a cellular phone, a cellular or other wireless communication device, a personal communication system (PCS) device, a personal navigation device (PND), a Personal Information Manager (PIM), a Personal Digital Assistant (PDA), a tablet or other similar device.

The computing device 100 may include a memory unit 102 and a processor 104 for performing operations for camera and/or object tracking in a captured video stream. In one embodiment, the computing device 100 may include one or more video cameras 106a,b integrated into the device 100 or connected to the device 100 through a wired or wireless peripheral connection. The video cameras 106a,b may capture video streams that will be used to perform camera and/or object tracking as will be more fully described below. The cameras 106a,b may use any type of image sensor capable of capturing a video stream, including a charge-coupled device (CCD) active pixel sensor and a complementary metal-oxide-semiconductor (CMOS) active pixel sensor.

In one embodiment, the computing device 100 may include a network interface unit 110 for communicating with one or more wired or wireless networks. The network interface unit 110 may provide components within the computing device 100 access to data stored on remote devices/servers. For example, the network interface unit 110 may provide processor 104 access to a video stream stored on a remote server, which is accessible over the Internet. The network interface unit 110 may be capable of communicating with remote devices/servers using various protocols. For example, the network interface unit 110 may be programmed to operate with one or more of code division multiple access (CDMA) protocols, time division multiple access (TDMA) protocols, frequency division multiple access (FDMA) protocols, 3GPP Long Term Evolution (LTE) protocols, Transmission Control Protocol and Internet Protocol (TCP/IP), IEEE 802.X, etc. For example, the network interface unit 110 may access and retrieve a video stream on a remote server using a wireless network channel.

In one embodiment, a surface normal solver 108 in the computing device 100 assists in performing camera and object tracking by solving the local geometry or surface normals of objects in a captured video stream. The surface normal solver 108 may process the video stream and solve for surface normals in conjunction with the processor 104, the memory unit 102, integrated digital signal processors 112, and other components of the computing device 100. Following the computation/estimation of accurate surface normals, corresponding objects or points between frames in the video stream may be precisely matched and tracked.

Figure 2:
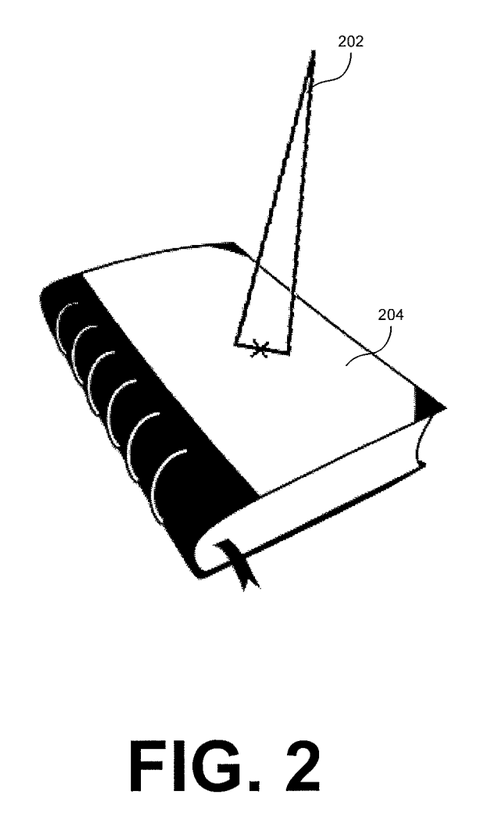
FIG. 2 shows a surface normal for a mappoint on a book in a first keyframe of a video stream.

FIG. 2 shows a surface normal 202 for a mappoint (e.g., a 3D feature point) on a book 204 in a first keyframe of a video stream. As used herein, a surface normal is a vector or plane that is orthogonal to a designated mappoint on an object in a keyframe. In one embodiment, precise normals for mappoints in a keyframe are initially unknown. However, hypothesis normals for the mappoints may be generated. The hypothesis normals represent approximations of surface normals relative to objects seen in the keyframes. As the video stream pans to a different view of an object (e.g., a book 204) in a second keyframe, the hypothesis surface normal generated for the mappoint can be scored by warping an image/feature patch from the first keyframe to an image/feature patch in the second keyframe using each normal in the set of hypothesis surface normals, and then computing the correlation score or warping error with the corresponding image/feature patch in the second keyframe (correlation score and warping error have an inverse relationship). If the correlation score between feature patches of the two frames as a result of this warping procedure (also described above) using a specific hypothesis surface normal is below a set threshold (such as 0.9 or 0.8), that particular hypothesis normal can be discarded. This inaccuracy may be shown by a high detected error score (i.e. low Normalized Cross Correlation (NCC) score) during a warping procedure between patches of the same mappoint in multiple keyframes. Accurate surface normals are important for augmentations to interact with surfaces in a physically plausible way. Specifically, each normal should be estimated to within about 5-10° for certain augmented reality applications. However the accuracy requirements may be different (lesser or greater) for other applications. Accordingly, discarding inaccurate hypothesis surface normals eliminates potential errors in later processing procedures.

NCC matching solves the problem of finding the similarity between two images. Through the use of NCC scores matching is invariant to mean and standard deviation (linear effects). For image data this means that NCC is invariant to brightness offsets and contrast changes. These characteristics for NCC scores are a much desired effect when comparing images that have been taken with different cameras or at different times of the day.

When calculating NCC scores over a search window, a reference patch is considered to find the location inside that search window for which the image/feature patch best matches. The following formula describes this operation:

$$\gamma(u,v) = \frac{\sum_{x,y}[f(x,y)-\bar{f}_{u,p}][t(x-u,y-v)-\bar{t}]}{\left\{\sum_{x,y}[f(x,y)-\bar{f}_{u,p}]^2 \sum_{x,y}[t(x-u,y-v)-\bar{t}]^2\right\}^{0.5}}$$

Where:
x,y are pixel positions inside the patch
u,v are pixel positions inside the search window
f( ) accesses patch data
t( ) accesses image data inside the search window
$\bar{f}_{u,v}$ (also written as $f_{avg}$) is the average of all pixels in the patch
$\bar{t}$ (also written as $t_{avg}$) is the average of all pixels of the area which the patch is currently compared against
$\sum_{x,y}[f(x,y)-\bar{f}_{u,v}]^2$ is the variance (squared standard deviation) of the patch
$\sum_{x,y}[t(x-u,y-v)-\bar{t}]^2$ is the variance (standard deviation) of the area currently compared against.

In the above equation, an optimal pair of pixel positions <u, v> are sought to obtain a best match.

Figure 3:
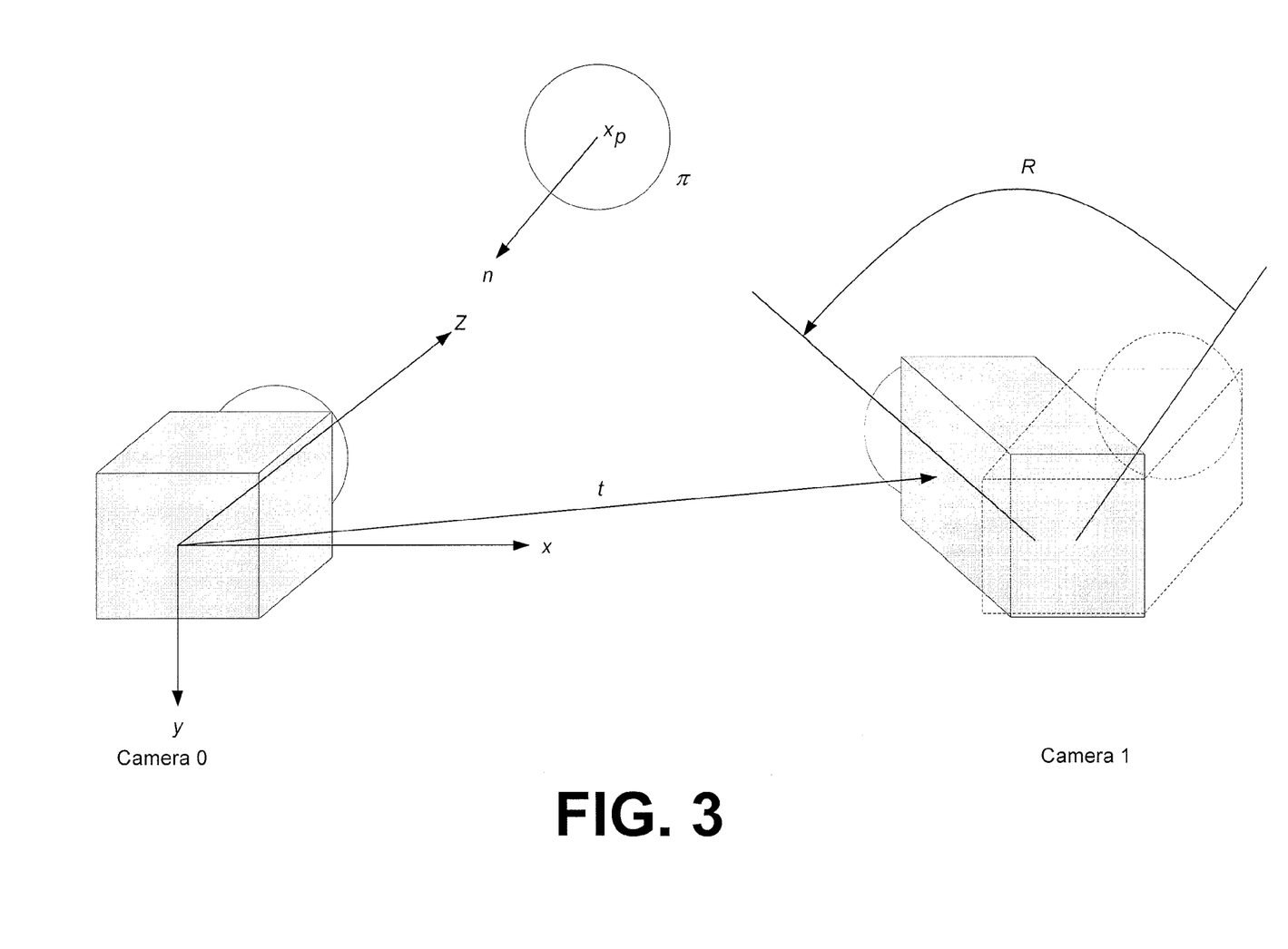
FIG. 3 shows two cameras viewing a planar patch.

Section 2.1 in the paper entitled "Locally Planar Patch Features for Real-Time Structure from Motion" by Nicholas Molton, Andrew Davison, and Ian Reid, which was presented at the 2004 British Machine Vision Conference, describes a method for performing patch warping. The method begins by analyzing the geometry of two cameras viewing a planar patch as shown in FIG. 3. In particular, FIG. 3 shows a scene containing a first camera (Camera 0) at the origin with zero rotation, a second camera (Camera 1) at position t, rotated by R from Camera 0, and a point at position $x_p$, which is on a locally planar surface with normal n. A point at position $(u_0, v_0)$ in the image plane of Camera 0 back projects to the ray $\rho u_0$, where $u_0=(u_0, v_0, 1)^T$. Points x on the plane p satisfy the equation $n^T x = n^T x_p$. At the intersection of the ray with the plane, $x=\rho u_0$, so $$\rho n^T u_0 = n^T x_p,$$

and $$\rho = \frac{n^T x_p}{n^T u_0}.$$

The intersection has homogeneous coordinates $(\rho v_0, 1)^T = (n^T x_p u_0, n^T u_0)^T$. Projecting this into the second image gives the equation:

$$u_1 = R[I\ |\ -t]\begin{pmatrix} n^T x_p u_0 \\ n^T u_0 \end{pmatrix} = R[n^T x_p I - t n^T]u_0$$

Where I is a 3×3 identity matrix. Therefore idealized image positions in the two camera images are related by the homography:

$$H_I = R[n^T x_p I - t n^T]$$

If the cameras have intrinsic matrices $C_0$ and $C_1$, the homography in pixel coordinates is:

$$H = C_1 R[n^T x_p I - t n^T]C_0^{-1}$$

This equation can be used to predict the transformation of a feature's visual appearance between its template image and the current camera image. Finding the difference between this prediction and the actual appearance of the feature, and the associated correction of the surface normal estimate is done using an image registration method. This method provides an inverse compositional adjustment (i.e., the original image transformation, $H_{n-1}$, is updated with an adjustment $H_i$, to give a new estimate of the transformation $H_n$, such that:

$$H_n = H_{n-1} H_i^{-1}$$

$H_i$ may be parameterized in terms of changes to the surface normal n The normal n is adjusted by adding a vector d, where $d = \alpha x_p^{-1} + \beta x_p^{-2}$. The vectors $x_p^{-1}$, and $x_p^{-2}$ can be chosen as any unit vectors which are perpendicular to each other and to $x_p$ and $\alpha$ and $\beta$ parameterize the amount of adjustment. The additive adjustment d is sufficient to vary the surface normal over the range of orientations for which the plane would be visible in Camera 0. Using the above equations, the adjustment transform $H_i$ (i.e., the warping matrix) becomes:

$$H_i = H_n^{-1} H_{n-1}$$
$$H_i = [C_1 R[(n+d)^T x_p I - t(n+d)^T] C_0^{-1}]^{-1} [C_1 R[n^T x_p I - tn^T] C_0^{-1}]$$
$$H_i = C_0 [n^T x_p I - tn^T + td^T]^{-1} [n^T x_p I - tn^T] C_0^{-1}$$
$$H_i = C_0 [n^T x_p I - tn^T + t(\alpha \bar{x}_p^1 + \beta \bar{x}_p^2)^T]^{-1} [n^T x_p I - tn^T] C_0^{-1}$$

In one embodiment, hypothesis normals for sets of keyframes are analyzed in a parallelizable architecture to determine their accuracy, where the set of normals are evaluated in parallel for determination of a high correlation score or low warping error, after warping, between pairs of keyframes. Hypothesizing possible surface normals and determining their accuracy using multiple pairs of keyframes provides a solution that is robust to image noise, compared to an alternative that employs gradient descent or a similar iterative approach. For example, this hypothesis driven system and process does not suffer from the problem of getting stuck in local minima depending on initialization. Further, gradient descent approaches are dependent on accurate estimates of image gradients, but image gradient estimates become inaccurate in the presence of image noise. Thus, hypothesis surface normal calculation is more robust in the presence of image pixel noise.

Figure 4:
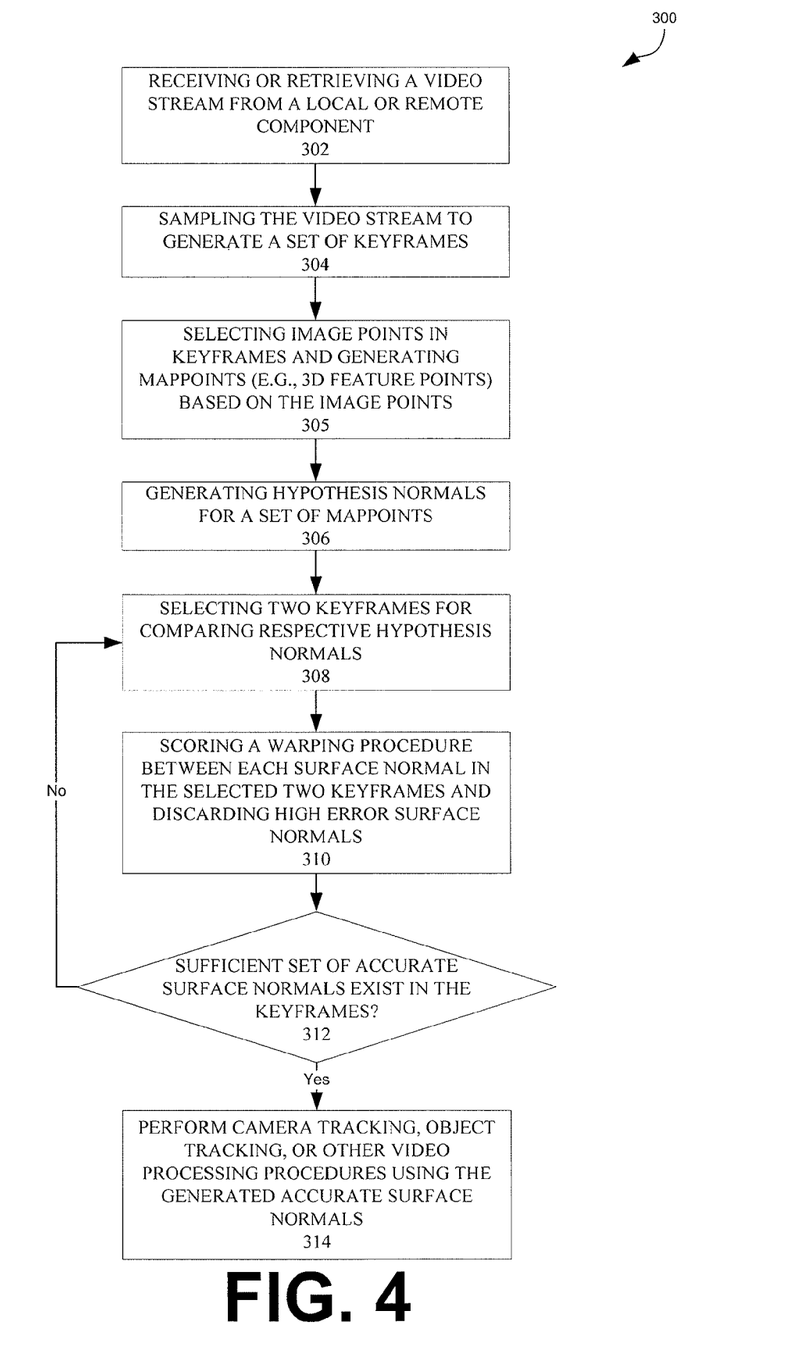
FIG. 4 shows a hypothesis based process for solving for the surface normals of objects in a parallelizable architecture.

FIG. 4 shows a hypothesis based process 300 for solving for the surface normals of objects in a parallelizable architecture. The process 300 may be performed by one or more of the components of the computing device 100 shown in FIG. 2. For example, the normal solver 108 may perform the operations described below in conjunction with the processor 104, the memory unit 102, and other components of the computing device 100.

The process 300 begins at operation 302 with the receipt or retrieval of a video stream. The video stream may be obtained from one of the cameras 106a,b or obtained from a local or remote memory source. For example, a video stream may be stored in the memory unit 102 and accessible by the surface normal solver 108 and the processor 104. In another instance, a video stream is stored on a remote server and accessible to the surface normal solver 108 through use of the network interface unit 110. The video stream may be encoded using any coding format or technique. For example, the video stream may be encoded using Advanced Video Codec High Definition (AVCHD), Audio Video Interleaved (AVI), Adobe Flash Video Format (FLV), Google Video File Format (GVI), H.264, and the Moving Picture Experts Group (MPEG) series of standards.

Upon receipt or retrieval at operation 302, the video stream is sampled at operation 304 to produce a series of keyframes. The number of keyframes obtained from the video stream may depend on the length of the video stream and a designated sampling rate. For example, a thirty second video stream may be sampled at a rate of 5 Hz to output 150 keyframes. In other embodiments, different sampling rates may be used. Each keyframe generated by the sampling at operation 304 is a complete representation of a scene in the video stream at a particular moment in time (e.g., a still image of the scene). The sampling rate is chosen to output keyframes that display significant differences or movement of objects within the video stream and provide a useful baseline. In one embodiment, a dedicated video sampling unit integrated into the computing device 100 samples the video stream to produce the set of keyframes.

At operation 305, image points are selected in the set of keyframes and the image points are used to generate mappoints (e.g., 3D feature points) in the scene observed by the set of keyframes. The image points are two-dimensional locations in the keyframes that correspond to three dimensional elements (i.e., 3D feature points) in the scene observed by the keyframes.

At operation 306, hypothesis normals are generated for a set of mappoints. In one embodiment, the hypothesis normals correspond to different discrete directions in the unit sphere of the scene represented in each keyframe. For example, a first hypothesis normal at a first mappoint may be directed at 45 degrees relative to the x-axis while a second hypothesis normal at a second mappoint may be directed at 90 degrees relative to the x-axis. Each of these hypothesis normals represents estimations of the surface normal of the objects imaged by the keyframes. In one embodiment, sets of hypothesis normals are generated for each mappoint. For example, 60 hypothesis surface normals for 60 separate mappoints may be generated. In other instances, 20-100 hypothesis surface normals may be generated. For example, in one embodiment 30 hypothesis surface normals for 30 separate mappoints may be generated while in another embodiment 50 hypothesis surface normals for 50 separate mappoints may be generated. Although these hypothesis surface normals are rough estimations, their accuracy will be determined through comparison and scoring as described in further detail below. Estimating and determining accurate surface normals is important for warping the appearance of patches in a keyframe between views with large baselines. Accordingly, discarding inaccurate hypothesis surface normals eliminates potential errors in later processing procedures.

At operation 308, two keyframes are selected for comparing respective hypothesis normals. The selected keyframes may be sequential/adjacent frames in the video stream or non-sequential/non-adjacent frames in the video stream. In one embodiment, the selected keyframes are chosen to be sufficiently separated in time to ensure movement of objects in a scene represented by the keyframes. For example, a lower separation limit may be set to indicate the necessary degree of separation between keyframes. The separation of the keyframes provides a wide enough baseline to be sufficiently discriminative for scoring/comparing the hypotheses/estimated normals. Although the keyframes are selected to be relatively separated, in one embodiment, the separation should not exceed an upper separation limit such that keyframes are not substantially dissimilar. For example, in a continuous set of 50 keyframes, the lower separation limit may be 3 keyframes while the upper separation limit may be 5 keyframes. In this example, the keyframes selected at operation 308 may be frames 5 and 9 (i.e., separated by 4 keyframes). In other embodiments, the lower separation limit may be in the range of 1-5 keyframes while the upper separation limit may be in the range of 5-10 keyframes. Although the upper and lower separation limits are represented in terms of keyframes, in other embodiments the separation limits may be represented in terms of time differences between keyframes in the original video stream. By choosing keyframes with relative similarity and a good baseline, warping and comparison operations may be more precisely performed.

Following the selection of two keyframes, operation 310 warps the appearance of an image pixel patch from one selected keyframe to the other selected keyframe using each of the hypothesis surface normals for the mappoint corresponding to that patch. In one embodiment, a window/patch of pixels may be a square or rectangular grid or patch of pixels (e.g., an 8×8 or 10×12 grid of pixels) centered at a predetermined location in an image represented in a keyframe. The warping may be performed using the warping matrix computed through the process described above. Each hypothesis surface normal is scored to determine accuracy (i.e., degree of error). In one embodiment, the score is based on a NCC (normalized cross correlation) score between the warped patch from a first keyframe and the target patch in the second keyframe, where the hypothesized normal is used to compute the warp. Hypothesis normals that result in a score above a predefined correlation score level are determined to be accurate hypotheses while scores that are below the predefined correlation score level are determined to be inaccurate and are discarded. Discarding low correlation score hypotheses eliminates improbable solutions while keeping more likely estimates. In one embodiment, the warping errors for multiple keyframes and warping procedures may be summed to improve the robustness of error estimation across multiple keyframes.

Figure 5:
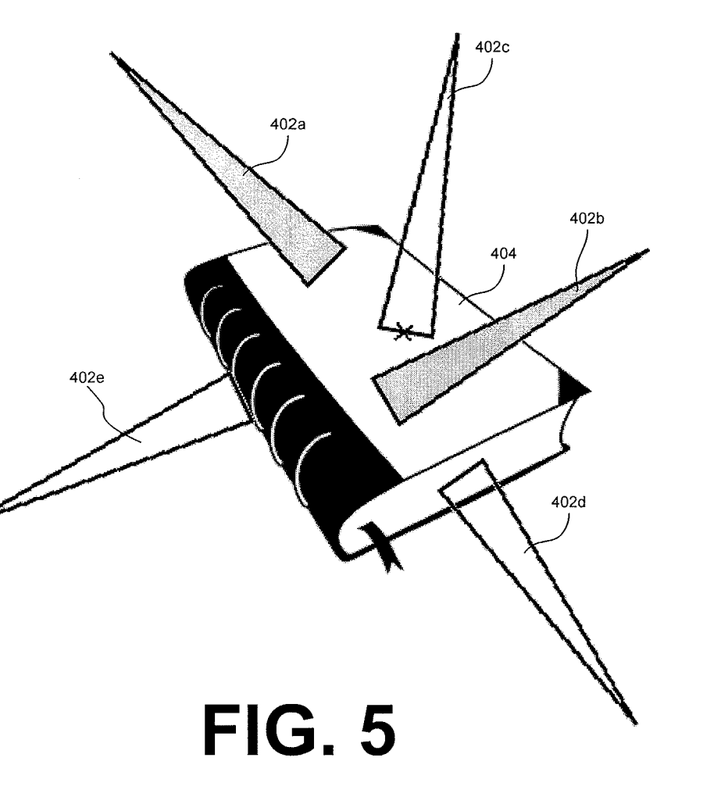
FIG. 5 shows an example keyframe with a set of hypothesis normals for a book 4.

FIG. 5 shows an example keyframe with a set of hypothesis normals 402 for a book 404. The shaded normals 402a,b represent inaccurate normals whose scores computed at operation 310 are below the predefined correlation score level, while the non-shaded normal 402c,d,e represent accurate normals whose scores are above the predefined correlation score level. As noted above, the inaccurate normals 402a,b (e.g., the shaded surface normal) are discarded while the accurate normals 402c,d,e are retained for use with camera and object tracking operations.

In one embodiment, operations 308 and 310 are repeated for multiple pairs of keyframes. For example, after keyframes 5 and 9 have been compared and warped revealing accurate and inaccurate normals in both frames, keyframe 5 may be processed with keyframe 2 in a similar manner. As frames are repeatedly compared, the number of computations decreases over time due to hypothesis pruning (i.e. eliminating improbable hypotheses early without testing them using all the pairs of frames).

By using multiple pairs of keyframes, the robustness of the estimation and surface normal solutions is increased. After a sufficient number of keyframe pairs have been compared/warped and at operation 312 there is determined to be a clear set of one or more surface normals that appear to be accurate, operations 308 and 310 are terminated as the normal estimation has converged. Thereafter, the finalized set of pruned surface normals may be used to perform camera tracking, object tracking, or other video processing procedures at operation 314. In one embodiment, operation 312 may determine a surface normal with the highest correlation score level (i.e., the lowest warping error). This determined surface normal with the highest correlation score may thereafter be used at operation 314 to perform camera tracking, object tracking, or other video processing procedures.

The process for solving for surface normals described above may be parallelized as the surface hypothesis normals are independent and corresponding comparisons/warping operations may be performed separately. This ability to be parallelizable and independently operable provides for the availability of potential hardware speedups exploiting cache locality.

In one embodiment, orientation histograms are used for initializing and refining hypothesis normals in each keyframe. For example, for each mappoint in a keyframe, the direction from the mappoint to the center of the camera is computed for each keyframe that observes this map point. The approximate normal estimate for the mappoint is the average of these vectors for each mappoint.

Figure 6:
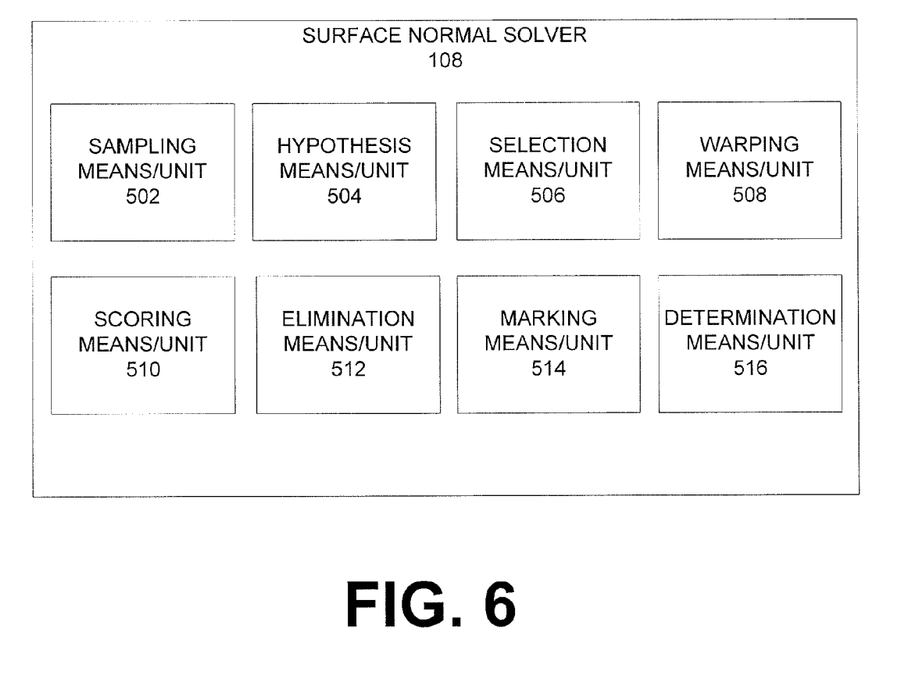
FIG. 6 shows a surface normal solver for performing camera and object tracking by solving the local geometry or surface normals of objects in a captured video stream.

FIG. 6 shows a functional unit block diagram and some constituent hardware components of the surface normal solver 108 according to one embodiment. The components shown in FIG. 6 are representative of elements included in the surface normal solver 108 and should not be construed as precluding other components. The components of the surface normal solver 108 may be used to perform one or more of the operations of the hypothesis based process 300 for solving for the surface normals of objects described above.

In one embodiment, the surface normal solver 108 includes a sampling means/unit 502. The sampling means 502 samples a video stream to produce a series of keyframes. The number of keyframes obtained from the video stream may depend on the length of the video stream and a designated sampling rate. The sampling rate is chosen to output keyframes that display significant differences or movement of objects within the video stream and provide a useful baseline. In one embodiment, the sampling means 502 may be a DSP, a general purpose hardware processor, a set of filters, and/or any similar device.

Figure 7:
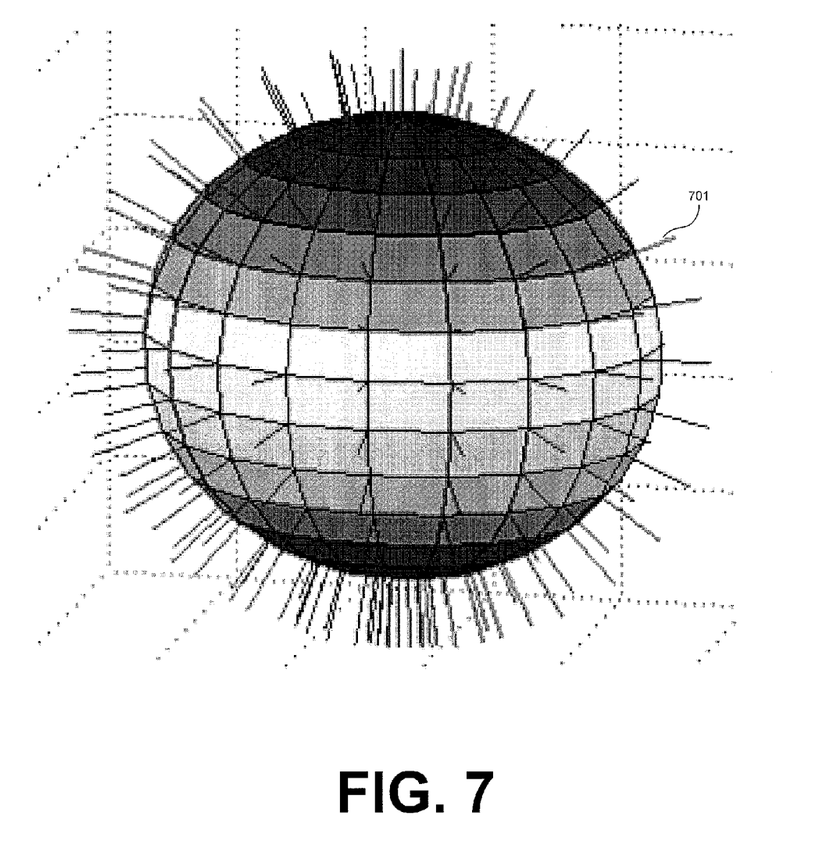
FIG. 7 shows hypothesis normal directions generated for a 3D feature point in a map.

In one embodiment, the surface normal solver 108 includes a hypothesis means/unit 504. The hypothesis means 504 generates a set of mappoints in each of the keyframes produced by the sampling means 502. In one embodiment, the hypothesis normals correspond to different discrete directions relative to the unit sphere of the scene represented in each keyframe. For example, FIG. 7 shows hypothesis normal directions, represented by lines 701 protruding from the sphere, generated for a 3D feature point in a map. The hypothesis means 504 may be a DSP, a general purpose hardware processor, a set of filters, and/or any similar device. In one embodiment, the hypothesis means 504 may select image points in the keyframes. The corresponding image points in two or more keyframes may be used to generate mappoints (e.g., 3D feature points) in the scene imaged by the keyframes, using well known techniques in Multiple View Geometry. For example, the book Multiple View Geometry in Computer Vision by Richard Hartley and Andrew Zisserman describe techniques that may be used to generate mappoints (e.g., 3D feature points). The image points are two-dimensional locations in the keyframes that correspond to three dimensional elements (i.e., 3D feature points) in the scene imaged by the keyframes.

In one embodiment, the surface normal solver 108 includes a selection means/unit 506. The selection means 506 selects two keyframes from the set of keyframes produced by the sampling means 502. In one embodiment, the selected keyframes are chosen to be sufficiently separated in time to ensure movement of objects in a scene represented by the keyframes. The selection means 506 may be a DSP, a general purpose hardware processor, a set of filters, and/or any similar device.

In one embodiment, the surface normal solver 108 includes a warping means/unit 508. The warping means 508 warps the appearance of an image patch from one selected keyframe to the other selected keyframe using each of the hypothesis surface normals for the mappoints corresponding to that patch. The warping means 508 may be a DSP, a general purpose hardware processor, a set of filters, and/or any similar device.

In one embodiment, the surface normal solver 108 includes a scoring means/unit 510. The scoring means 510 scores each surface normal to determine accuracy (i.e., degree of error). In one embodiment, the score is a NCC (normalized cross correlation) score between the warped patch from a first keyframe and the target patch in the second keyframe, where the hypothesized normal is used to compute the warp. In one embodiment, the scoring means 510 sums the warping errors for multiple keyframes to improve error estimation across multiple keyframes. The scoring means 510 may be a DSP, a general purpose hardware processor, a set of filters, and/or any similar device.

In one embodiment, the surface normal solver 108 includes an elimination means/unit 512 and a marking means/unit 514. The elimination means 512 discards/eliminates hypothesis normals that score below a predefined correlation score level while the marking means 514 marks hypothesis normals that score above a predefined correlation score level. Hypothesis normals that score above a predefined correlation score level are determined to be accurate hypotheses while scores below the predefined correlation score level are determined to be inaccurate and are discarded. Discarding low correlation score hypotheses eliminates improbable solutions while keeping more likely estimates. The elimination means 512 and the marking means 514 may each be a DSP, a general purpose hardware processor, a set of filters, and/or any similar device.

In one embodiment, the surface normal solver 108 includes a determination means/unit 516. The determination means 516 determines whether the set of marked surface normals is greater than or equal to a predefined number of surface normals. When the number of marked surface normals is below the predefined number, the determination means 516 causes the warping means, the scoring means, and the elimination means to process a new pair keyframes. The determination means 516 may be a DSP, a general purpose hardware processor, a set of filters, and/or any similar device. In one embodiment, the determination means 516 may determine a surface normal with the highest correlation score level (i.e., the lowest warping error). This determined surface normal with the highest correlation score may thereafter be used to perform camera tracking, object tracking, or other video processing procedures.

The methodologies described herein may be implemented by various means depending upon the application. For example, these methodologies may be implemented in hardware, firmware, software, or any combination thereof. For an implementation involving hardware, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A method for solving for surface normals of objects in a video stream, comprising:
    sampling the video stream to generate a set of keyframes;
    selecting a plurality of image points in the set of keyframes;
    generating corresponding 3D feature points to the plurality of image points in a scene imaged by the set of keyframes using the plurality of image points in the set of keyframes;
    generating hypothesis surface normals corresponding to each of the 3D feature points;
    warping image pixel patches corresponding to 3D feature points in a first keyframe to a viewpoint of a second keyframe with a warping matrix computed from each of the hypothesis surface normals;
    scoring warping errors resulting from each hypothesis surface normal between the first and second keyframes; and discarding hypothesis surface normals that produce scores for warping errors between the first and the second keyframes above a predefined level.

2. The method of claim 1, further comprising:
marking non-discarded hypothesis surface normals as accurate estimations.

3. The method of claim 2, further comprising:
determining whether a number of marked surface normals is greater than or equal to a predefined number of surface normals; and
repeating the warping, scoring, and discarding operations with a new pair of keyframes upon determining the number of marked surface normals is less than the predefined number of surface normals.

4. The method of claim 3, further comprising:
determining a hypothesis surface normal with the lowest warping error.

5. The method of claim 4, further comprising:
performing one of camera tracking and object tracking in the video stream using the determined hypothesis surface normal with the lowest warping error.

6. The method of claim 4, further comprising:
performing one of camera tracking and object tracking in the video stream using the marked surface normals.

7. The method of claim 4, further comprising:
summing the warping errors for multiple keyframes.

8. The method of claim 1, wherein the warping errors are based on normalized cross correlation scores.

9. The method of claim 1, further comprising:
selecting the first and second keyframes for warping with baselines within a predefined separation range.

10. The method of claim 1, wherein the first and second keyframes are non-sequential keyframes in the video stream.

11. A non-transient machine-readable medium comprising instructions, which, when executed by a machine, cause the machine to perform operations for solving for surface normals of objects in a video stream, the instructions comprising:
sample the video stream to generate a set of keyframes;
select a plurality of image points in the set of keyframes;
generate corresponding 3D feature points to the plurality of image points in a scene imaged by the set of keyframes using the plurality of image points in the set of keyframes;
generate hypothesis surface normals corresponding to each of the 3D feature points;
warp image pixel patches corresponding to 3D feature points in a first keyframe to a viewpoint of a second keyframe with a warping matrix computed from each of the hypothesis surface normals;
score warping errors resulting from each hypothesis surface normal between the first and second keyframes; and
discard hypothesis surface normals that produce scores for warping errors between the first and the second keyframes above a predefined level.

12. The non-transient machine-readable medium of claim 11, wherein the instructions further comprise:
mark non-discarded hypothesis surface normals as accurate estimations.

13. The non-transient machine-readable medium of claim 12, wherein the instructions further comprise:
determine whether a number of marked surface normals is greater than or equal to a predefined number of surface normals; and
repeat the warp, score, and discard instructions with a new pair of keyframes upon determining the number of marked surface normals is less than the predefined number of surface normals.

14. The non-transient machine-readable medium of claim 13, wherein the instructions further comprise:
determine a hypothesis surface normal with the lowest warping error.

15. The non-transient machine-readable medium of claim 14, wherein the instructions further comprise:
perform one of camera tracking and object tracking in the video stream using the determined hypothesis surface normal with the lowest warping error.

16. The non-transient machine-readable medium of claim 14, wherein the instructions further comprise:
perform one of camera tracking and object tracking in the video stream using the marked surface normals.

17. The non-transient machine-readable medium of claim 14, wherein the instructions further comprise:
sum the warping errors for multiple keyframes.

18. The non-transient machine-readable medium of claim 11, wherein the warping errors are based on normalized cross correlation scores.

19. The non-transient machine-readable medium of claim 11, wherein the instructions further comprise:
select the first and second keyframes for warping with baselines within a predefined separation range.

20. The non-transient machine-readable medium of claim 11, wherein the first and second keyframes are non-sequential keyframes in the video stream.

21. A computing device for solving for surface normals of objects in a video stream, comprising:
a sampling means for sampling the video stream to generate a set of keyframes;
a hypothesis means for selecting a plurality of image points in the set of keyframes, generating corresponding 3D feature points to the plurality of image points in a scene imaged by the set of keyframes using the plurality of image points in the set of keyframes, and generating hypothesis surface normals corresponding to each of the 3D feature points;
a warping means for warping image pixel patches corresponding to 3D feature points in a first keyframe to a viewpoint of a second keyframe with a warping matrix computed from each of the hypothesis surface normals;
a scoring means for scoring warping errors resulting from each hypothesis surface normal between the first and second keyframes; and
an elimination means for discarding hypothesis surface normals that produce scores for warping errors between the first and the second keyframes above a predefined level.

22. The computing device of claim 21, further comprising:
a marking means for marking non-discarded hypothesis surface normals as accurate estimations.

23. The computing device of claim 22, further comprising:
a determination means for determining whether a number of marked surface normals is greater than or equal to a predefined number of surface normals, wherein upon determining the number of marked surface normals is less than the predefined number of surface normals (1) the warping means warps image pixel patches of corresponding 3D feature points in a new pair of keyframes, (2) the scoring means scores warping errors between each hypothesis surface normal in the new pair of keyframes, and (3) the elimination means discards hypothesis surface normals in the new pair of keyframes with high warping errors.

24. The computing device of claim 23, wherein the marking means further determines a hypothesis surface normal with the lowest warping error.

25. The computing device of claim 24, wherein the marked hypothesis surface normals are used for performing one of camera tracking and object tracking in the video stream.

26. The computing device of claim 24, wherein the determined hypothesis surface normal with the lowest warping error is used for performing one of camera tracking and object tracking in the video stream.

27. The computing device of claim 24, wherein the scoring means sums the warping errors for multiple keyframes.

28. The computing device of claim 21, wherein the warping errors are based on normalized cross correlation scores.

29. The computing device of claim 21, further comprising:
a selection means for selecting the first and second keyframes for warping with baselines within a predefined separation range.

30. The computing device of claim 21, wherein the first and second keyframes are non-sequential keyframes in the video stream.

31. A computing device with a processor for solving for surface normals of objects in a video stream, comprising:
a camera for capturing the video stream;
a surface normal solver, comprising:
a sampling unit for sampling the video stream to generate a set of keyframes;
a hypothesis unit for selecting a plurality of image points in the set of keyframes, generating corresponding 3D feature points to the plurality of image points in a scene imaged by the set of keyframes using the plurality of image points in the set of keyframes, and generating hypothesis surface normals corresponding to each of the 3D feature points;
a warping unit for warping image pixel patches corresponding to 3D feature points in a first keyframe to a viewpoint of a second keyframe with a warping matrix computed from each of the hypothesis surface normals;
a scoring unit for scoring warping errors resulting from each hypothesis surface normal between the first and second keyframes; and
an elimination unit for discarding hypothesis surface normals that produce scores for warping errors between the first and the second keyframes above a predefined level.

32. The computing device of claim 31, wherein the surface normal solver further comprises:
a marking unit for marking non-discarded hypothesis surface normals as accurate estimations.

33. The computing device of claim 32, wherein the surface normal solver further comprises:
a determination unit for determining whether a number of marked surface normals is greater than or equal to a predefined number of surface normals, wherein upon determining the number of marked surface normals is less than the predefined number of surface normals (1) the warping unit warps image pixel patches of corresponding 3D feature points in a new pair of keyframes, (2) the scoring unit scores warping errors between each hypothesis surface normal in the new pair of keyframes, and (3) the elimination unit discards hypothesis surface normals in the new pair of keyframes with high warping errors.

34. The computing device of claim 33, wherein the marking unit further determines a hypothesis surface normal with the lowest warping error.

35. The computing device of claim 34, wherein the set of marked hypothesis surface normals are used for performing one of camera tracking and object tracking in the video stream.

36. The computing device of claim 34, wherein the determined hypothesis surface normal with the lowest warping error is used for performing one of camera tracking and object tracking in the video stream.

37. The computing device of claim 34, wherein the scoring unit sums the warping errors for multiple keyframes.

38. The computing device of claim 31, wherein the warping errors are based on normalized cross correlation scores.

39. The computing device of claim 31, wherein the surface normal solver further comprises:
a selection unit for selecting the first and second keyframes for warping with baselines within a predefined separation range.

40. The computing device of claim 31, wherein the first and second keyframes are non-sequential keyframes in the video stream.

* * * * *